United States Patent [19]

Honsho et al.

[11] Patent Number: 5,316,234
[45] Date of Patent: May 31, 1994

[54] TAPE CASSETTE FOR CASSETTE RECORDING/REPRODUCING APPARATUS

[75] Inventors: Hironori Honsho, Neyagawa; Fuminari Saito, Kawanishi, both of Japan

[73] Assignee: Matsushita Electric Industrial Co., Ltd., Osaka, Japan

[21] Appl. No.: 706,998

[22] Filed: May 29, 1991

[51] Int. Cl.$^5$ .................... G11B 23/04; G11B 23/08
[52] U.S. Cl. ................... 242/198; 242/199; 360/132
[58] Field of Search .............. 242/199, 198; 360/132

[56] References Cited

U.S. PATENT DOCUMENTS

| 4,418,373 | 11/1983 | Fujimori et al. | 360/132 |
|---|---|---|---|
| 4,449,677 | 5/1984 | Ohta et al. | 242/199 |
| 4,556,153 | 12/1985 | Takagi et al. | 242/199 X |
| 4,633,355 | 12/1986 | Harada | 242/198 X |
| 4,646,191 | 2/1987 | Goto | 242/199 X |
| 4,672,497 | 6/1987 | Ueda | 242/198 X |
| 4,698,713 | 10/1987 | Kawada | 242/198 |
| 4,717,980 | 1/1988 | Shiba et al. | 242/199 X |
| 4,789,114 | 12/1988 | Tanaka | 242/199 |
| 4,897,751 | 1/1990 | Goto | 360/132 |
| 4,989,111 | 1/1991 | Sato | 242/199 X |

FOREIGN PATENT DOCUMENTS

| 0203417 | 12/1986 | European Pat. Off. |  |
|---|---|---|---|
| 0285384 | 10/1988 | European Pat. Off. |  |
| 2719985 | 11/1977 | Fed. Rep. of Germany | 360/132 |
| 0005485 | 1/1985 | Japan | 360/132 |
| 0113382 | 6/1985 | Japan | 360/132 |
| 60-214488 | 10/1985 | Japan |  |
| 62-185288 | 8/1987 | Japan |  |
| 63-16824 | 4/1988 | Japan |  |
| 63-16830 | 4/1988 | Japan |  |
| 63-18271 | 4/1988 | Japan |  |
| 63-175279 | 7/1988 | Japan |  |
| 2020630 | 11/1979 | United Kingdom |  |
| 2134485 | 8/1984 | United Kingdom | 360/132 |

Primary Examiner—Daniel P. Stodola
Assistant Examiner—William Stryjewski
Attorney, Agent, or Firm—Wenderoth, Lind & Ponack

[57] ABSTRACT

A tape cassette comprises a pair of reels fixedly holding leading and trailing ends of a tape; and a cassette case containing the pair of reels with a forwardly exposed portion of the tape being extended at the front of the case. An opening is provided inside a forward portion of the case, and left and right side walls are arranged in the cassette case for defining the opening. Two or more tape guides are arranged adjacent to left and right ends of the opening, respectively, for guiding the forwardly exposed portion of the tape. A front lid is pivotably supported by the cassette case for covering the front of the forwardly exposed portion of the tape when closed, and an inner lid is pivotably supported by the front lid for covering the back of the tape when closed. Guiding grooves are arranged in the left and right side walls, respectively, for controlling a pivotal movement of the inner lid. At least one of the tape guides is spaced by a distance L from the opening-side end of its corresponding left or right side wall which has a thickness of T, such that L<T is established.

3 Claims, 12 Drawing Sheets

TAPE CASSETTE FOR CASSETTE RECORDING/REPRODUCING APPARATUS

BACKGROUND OF THE INVENTION

1. Field of the Invention

The present invention relates to a tape cassette and more particularly, a tape cassette suitable for use with a magnetic recording/reproducing apparatus, e.g. a video tape recorder.

2. Description of the Prior Art

In common arrangements, a tape cassette for use with a magnetic tape device such as a video tape recorder has encased therein a magnetic tape of which a forwardly exposed portion is arranged in the front of a casing along a path defined by a space between a front lid and an inner lid of the casing (for example, as disclosed in Japanese Patent Laid-open Publication 63-175279 (1988)).

The conventional tape cassette has one opening provided in the front thereof and extending approximately throughout the width thereof. The exposed portion of the magnetic tape which is protected between the front and inner lids can thus be guided through the opening with guiding members.

The front lid is mounted for pivotal movement by a pivot pin.

In addition, the front lid has a pair of brackets mounted in the upper inner side thereof. The inner lid has at both ends a couple of support pins which are engaged in the two brackets, respectively, so that the inner lid can turn about the support pins.

The inner lid also has at both ends a couple of left and right guide pins which are slidably engaged in guiding grooves provided in the casing. The left and right guiding grooves are arranged symmetrically with respect to the center line of the casing. Also, the relation between the support pins and the guiding pins has symmetry.

Each of the guiding members is fabricated by forming a resin into a semicircular shape for providing a wider area for tape passage.

The conventional tape cassette is provided with a locking member pivotably mounted on the casing for prevention of inadvertent opening of the front lid. The locking member is urged by a plate spring toward a forward leaning.

The front lid has a projection arranged on the side thereof for engagement with a hook of the locking member and can thus be prevented from rotating.

A tape cassette positioning portion is arranged at the front of the casing, where the locking member is not mounted, for determining the position of the tape cassette during loading.

The operation of such a conventional tape cassette having the foregoing arrangement will now be described.

When the tape cassette is loaded into a video tape recorder (referred to as a VTR hereinafter), the positioning portion arranged in the front of its casing comes into contact with a cassette stopper provided in the VTR and remains secured. Simultaneously, the locking member is allowed by a lock releasing member of the VTR to rotate against the urging force of the spring. As a result, the front lid is unlocked and turned upward.

As the front lid is opened, the inner lid moves upward with its support pins turning about the pivot pins. Also, its guide pins travel along their respective guiding grooves until the inner lid is completely opened and a loading post assembly of the VTR moves into the opening of the tape cassette.

The above is a description of the operation of loading the cassette into a VTR. The unloading will be carried out in reverse order of the loading.

However, the following disadvantages are inherent in the conventional tape cassette.

(1) The semicircular resin guiding members are provided for widening the tape path area to ease the feeding of the tape from the casing. This provides low guiding accuracy. Also, such an arrangement is critically affected by unfavorable environmental changes and suffers from deterioration with time and thus, damage to the tape will hardly be avoided. If the semicircular guiding post members are made of metallic materials, their production will create another difficulty and the overall cost will be increased.

If the guiding post members are of simple cylindrical shaped metal, the tape path area becomes reduced and the arrangement in the VTR will be greatly restricted in terms of freedom of design.

(2) The single opening in the casing restricts the tape loading path or the tape loading mechanism. For example, the use of an M loading arrangement, e.g. in the VHS VTR system, which is compact in size and mechanically simple, requires a wider opening of the tape cassette. If the opening in the casing is small with respect to the overall width of the tape cassette, the M loading arrangement will encounter great difficulty.

On the other hand, if the opening is widened, the forwardly exposed portion of the tape will easily be deflected causing direct contact with the inner lid. Accordingly, the opening cannot be widened arbitrarily or damage to the tape may result.

Another conventional tape cassette is disclosed in the Japanese Patent Laid-open Publication 60-214488 (1985) and has three openings arranged in its casing so as to solving the above problems. When this tape cassette is used with a U loading arrangement, e.g. of the β or 8 mm VTR system, a plurality of guiding posts have to move across its three openings for loading. This loading operation can be facilitated by mounting the plural posts on one ring member. At the same time, the shape of the openings should have symmetry and extend continuously and widely for ensuring the efficient movement of the ring. However, the openings of the conventional tape cassette are narrow in width, are spaced apart from each other, and are not symmetrical. Also, they are not favorable in appearance.

(3) The locking member for prevention of inadvertent opening of the front lid and the positioning portion for determining the position of the tape cassette in loading are provided in different locations. This allows both the positional relation between the locking member and the positioning portion of the tape cassette and the positional relation between the positioning stopper and the lock releasing member of the VTR to develop an error in combination and thus, the locking and unlocking action will be conducted with less accuracy.

SUMMARY OF THE INVENTION

It is an object of the present invention to provide an improved tape cassette wherein:

(1) a tape path area of the cassette remains wide (or clear) due to the use of metal posts which provide high guiding accuracy and are less affected by unwanted environmental change or deterioration with time, thus ensuring minimum damage to the tape;

(2) a front opening of the cassette is suitable for use with both the M and U loading systems and exhibits good appearance; and (3) the opening of a front lid of the cassette can be locked and unlocked with high accuracy, thus ensuring that the tape is protected from dust.

A tape cassette according to the present invention is provided with left and right side walls which define an opening provided in a cassette case, and two or more tape guides arranged adjacent to left and right ends of the opening for guiding a forwardly exposed portion of a magnetic tape. A distance between at least one of the tape guides and an opening-side end of its corresponding left or right side wall is smaller than a thickness of the side wall. Accordingly, the tape path area remains wide (or clear) with the use of metal posts which provide high guiding accuracy and are less affected by unwanted environmental change or deterioration with time, thus ensuring minimum damage to the tape and also protection of the tape from dust.

DESCRIPTION OF THE PREFERRED EMBODIMENT

Figure 1:
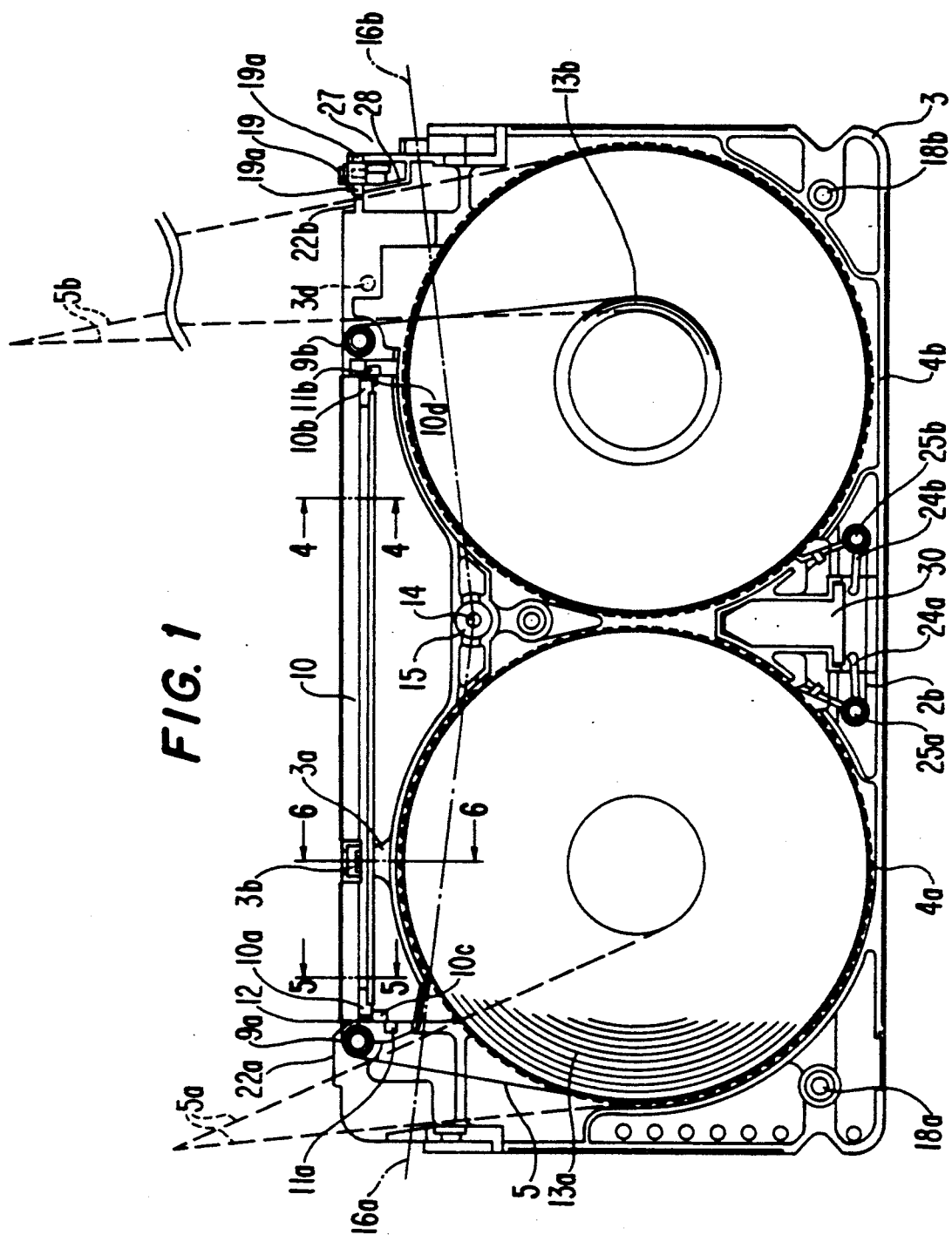
FIG. 1 is a plan view showing one embodiment of the present invention in which both an upper cassette case and a front lid are removed.

One preferred embodiment of the present invention will be described with reference to FIGS. 1 to 7.

As shown, a tape cassette 1 is externally shaped into a flat cassette form and includes an upper case 2 and a lower case 3 fixedly coupled to each other and contains. Reels 4a and 4b are arranged between the upper and lower cases and carry a magnetic tape 5. The magnetic tape 5 is wound around the two reels 4a and 4b with its leading and trailing ends tied (or fixed) to the reels, respectively.

Also provided is a front lid 6 for covering the upper portion and front of the magnetic tape 5. The front lid 6 has a pair of front lid pivot shafts 6a and 6b arranged on the left and right side plates thereof and extending between the upper and lower cases 2 and 3 so that it can pivot about the coaxial axes of the pivot shafts 6a and 6b. The front lid 6 is urged toward the closing direction by a front lid spring 7 mounted on the pivot shaft 6b. The front lid spring 7 is a twisted coil spring supported at one end by the upper case 2 and at the other end by a spring hook 6c arranged on the front lid 6.

Represented by 8a and 8b are openings separated from each other by a partition portion 3a of the lower case 3 and arranged to accept loading posts (not shown) which will move into the openings in order to draw the magnetic tape 5 out of the upper and lower cases 2 and 3. The partition portion 3a is incorporated at its front with a tape guard (stopper plate) 3b arranged for preventing a forward exposed portion of the magnetic tape 5 from being tensioned backward. The partition portion 3a also has a position determining hole 3c provided therein for positioning the tape cassette 1. The position determining hole 3c is accompanied by another hole 3d, thus forming a first position determining hole means.

The partition portion 3a is located on a line extending from back to front across the center of the reel 4a, and the forwardly exposed portion of the magnetic tape 5 is spaced minimally from the walls of the respective upper and lower cases 2 and 3, so that the area of the openings 8a and 8b is maximized.

An opening 8b having an approximately symmetrical shape is arranged to extend approximately in the center of the tape cassette 1.

The forwardly exposed portion of the magnetic tape 5 is tensioned and guided by stainless guide posts 9a and 9b arranged approximately at the left and right ends of the upper 2 or lower case 3 respectively so that it can extend at the front of the upper and lower cases 2 and 3. The stainless guide posts 9a and 9b are made of non-magnetic material and are precision finished to have a surface roughness of less than 0.4 μm.

In addition, an inner lid 10 is provided across the two openings 8a and 8b for covering the back of the magnetic tape 5. The inner lid 10 has a pair of left- and rightward extending inner lid pivot shafts 10a and 10b arranged on both sides thereof. The two inner lid pivot shafts 10a and 10b are supported by the bearings 6e of two brackets 6d arranged integrally with the front lid 6 so that the inner lid 10 can pivot about the axes of the pivot shafts 10a and 10b.

Figure 6A:
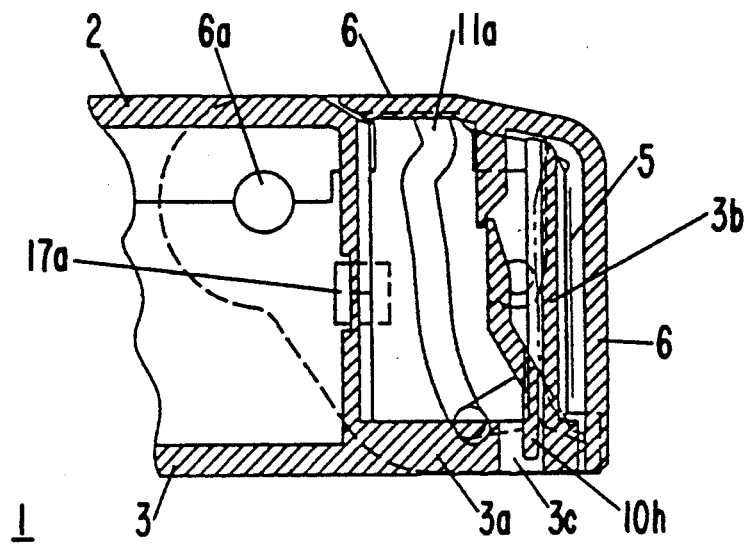
FIGS. 6(a) and 6(b) are cross-sectional views of the tape cassette taken along the line 6—6 of FIG. 1 showing the closing and opening states of the front lid, respectively.
Figure 6B:
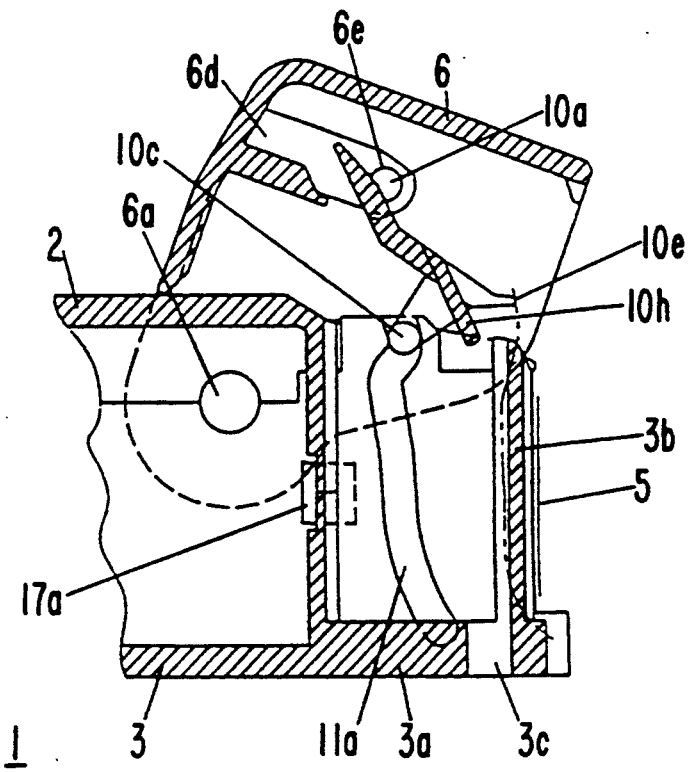
Figure 7:
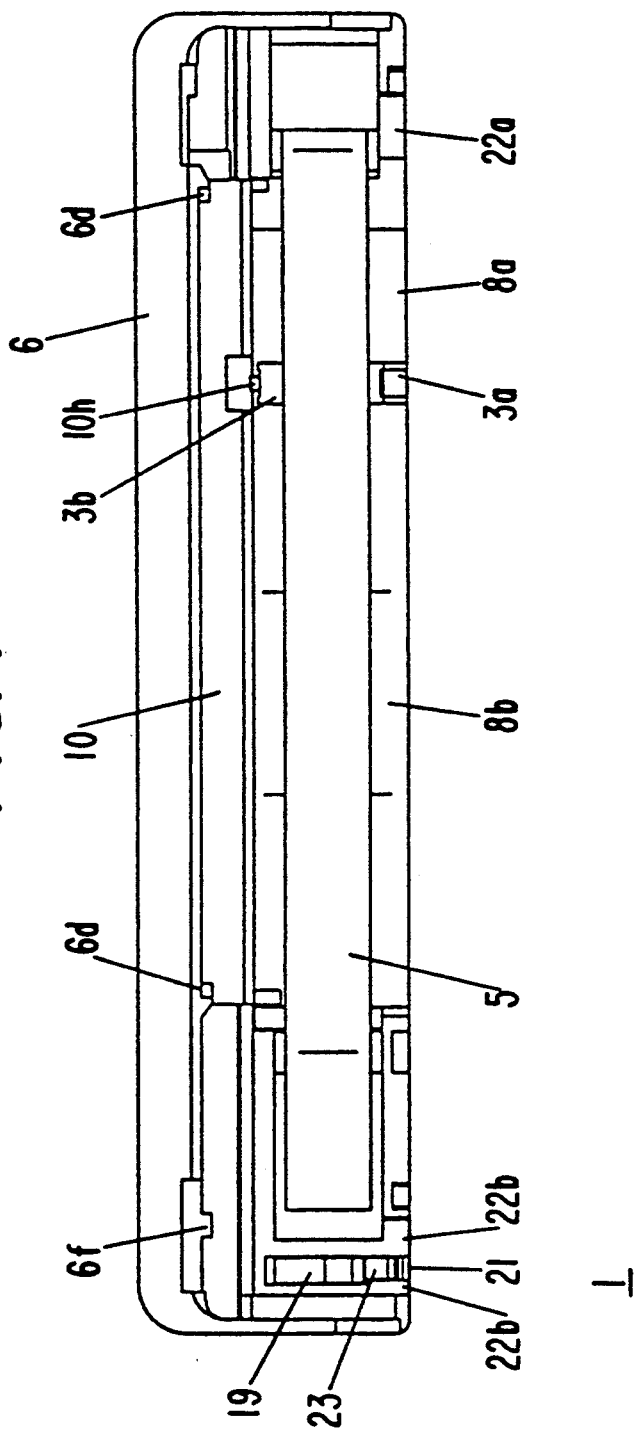
FIG. 7 is a front view of the tape cassette with the front lid open.

As best shown in FIGS. 6(a) and 6(b), the tape guard 3b is enclosed in a space between the front and inner lids 6 and 10 when they are closed.

A protrudent chip 10h is mounted on the inner lid 10 so that it can move into the first position determining hole 3c when the inner lid 10 is closed and come adjacent to the upper end of the tape guard 3b when the inner lid 10 is opened.

The protrudent chip 10h prevents the forwardly exposed portion of the magnetic tape 5 from undesirably moving behind the tape guard 3b during the open state and the opening movement of the front and inner lids 6 and 10.

A guiding groove 11a is provided at the left end of the opening 8a of the lower case 3 for guiding a left guide pin 10c mounted on the left end of the inner lid 10. The distance L1 from the left end of the opening 8a to the guide post 9a is smaller than the thickness T1 of the left-side wall 3e of the lower case 3, which is expressed as L1<T1. Also, a right guiding groove 11b is provided at the right end of the opening 8b of the lower case 3 for guiding a right guide pin 10d mounted on the right end of the inner lid 10. The relation between the distance L2 and the thickness T2 of the right-side wall 3 of the lower case 3 is expressed as L2>T2. The depths D1 and D2 of their respective openings 8a and 8b along the left and right walls 3e and 3f, respectively, are designated as D1>D2. As shown in FIGS. 4 and 5, the left and right guiding grooves 11a and 11b have different shapes and are not equally distanced form the front end 1a of the tape cassette 1.

In particular, the relative arrangement of the left guide pin 10c to the inner lid pivot shaft 10a is not equal to that of the right guide pin 10d to the inner lid pivot shaft 10b, to thereby provide non-symmetrical movement.

Figure 2:
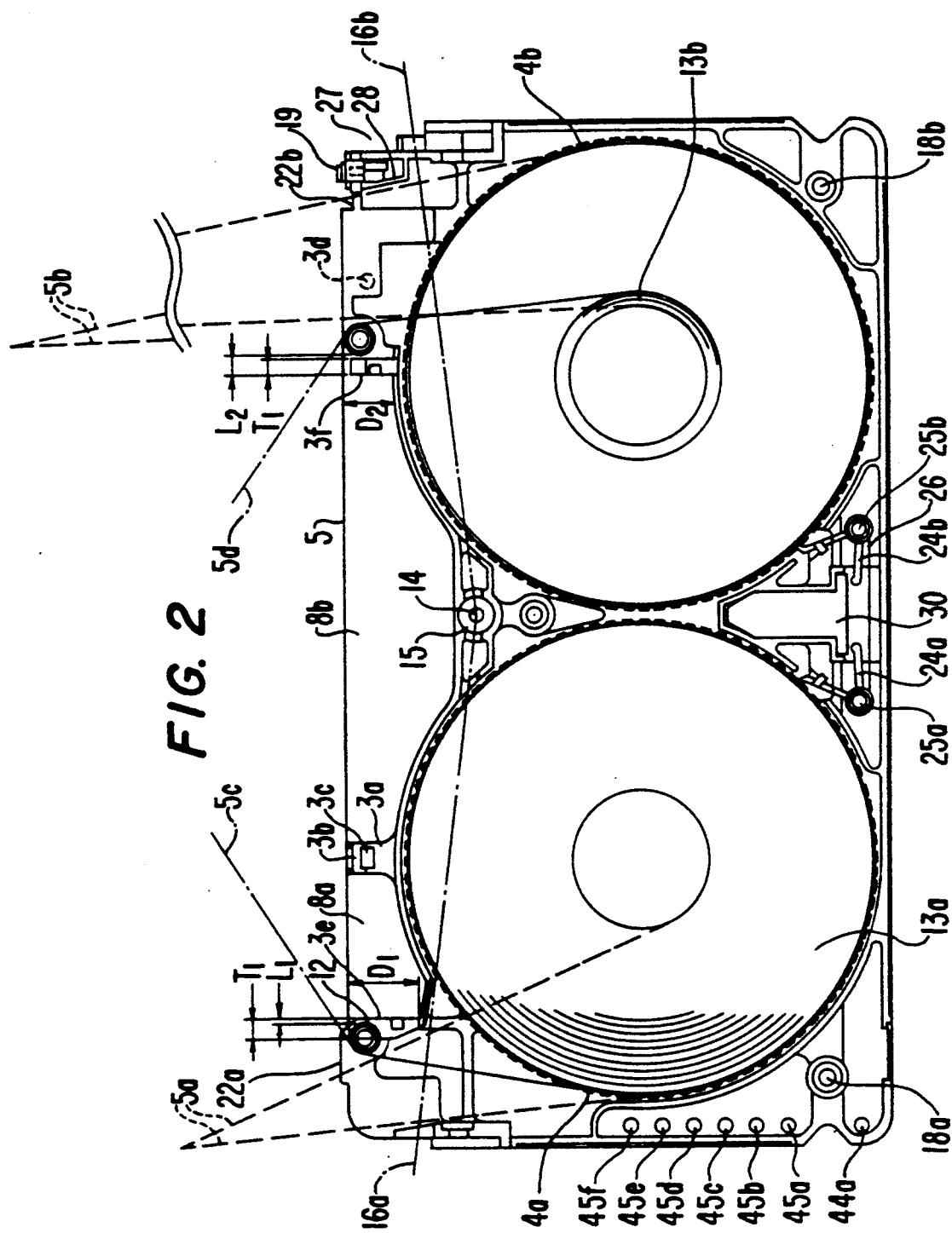
FIG. 2 is a plan view of the same with an inner lid removed.
Figure 3A:
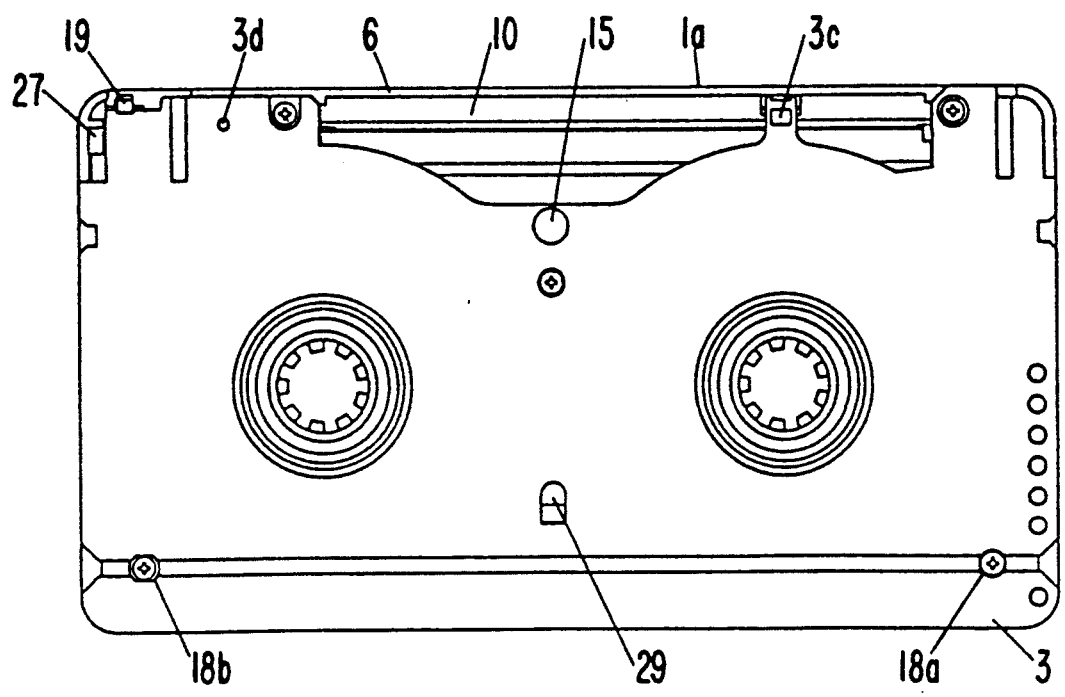
FIG. 3(a) is a bottom view of a tape cassette according to the present invention.
Figure 3B:
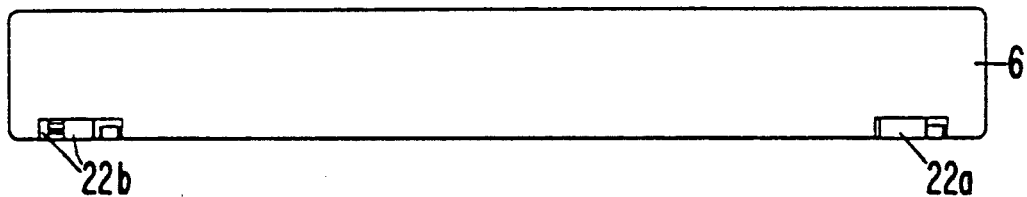
FIG. 3(b) is a front view of a tape cassette according to the present invention.
Figure 3C:
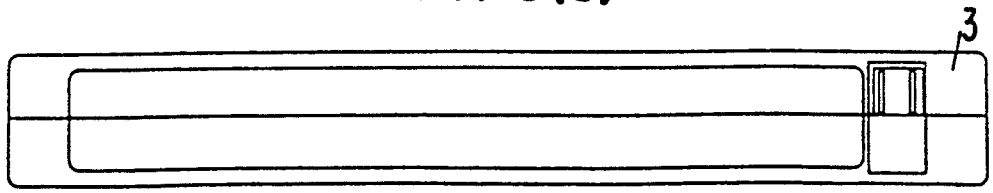
FIG. 3(c) is a rear view of the tape cassette according to the present invention.
Figure 3D:
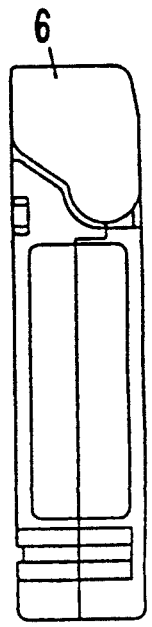
FIG. 3(d) is a right side view of the tape cassette according to the present invention.
Figure 3E:
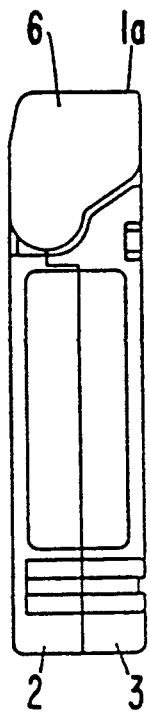
FIG. 3(e) is a left side view of the tape cassette according to the present invention.

The dotted lines 5a and 5b illustrated in both FIGS. 1 and 2 define tape path areas through which the magnetic tape 5 can pass as it is being unwound from both, left and right, tape rolls 13a and 13b. The tape path areas 5a and 5b are determined so as to prevent the running tape 5 from directly contacting the guide posts 9a and 9b of the tape cassette 1.

The one-dot chain lines 5c and 5d shown in FIG. 2 represent tape paths for high-speed running of the magnetic tap 5 from the respective left and right tape rolls 13a and 13b directly on the guide posts 9a and 9b.

Denoted by 12 is a thin wall portion of the lower case 3 arranged by placing the guide post 9a closer to the opening 8a for the purpose of increasing the left tape path area 5a for common tape passing.

As explained, the tape rolls 13a and 13b of the magnetic tape 5 are carried on their respective reels 4a and 4b.

A light house 14 is also provided and comprises a photodiode which emits light to a photosensor (not shown) for detection of the leading and trailing ends of the magnetic tape 5.

An insertion hole 15 is arranged in the bottom of the lower case 3 for accepting the lighthouse 14 which advances into the tape cassette 1 on loading.

In operation, the light emitted from the lighthouse 14 inserted into the insertion hole 15 is directed along the light paths 16a and 16b from the inside, defined by the upper and lower cases 2 and 3, through two light path windows 17a and 17b arranged in the left and right side walls of the upper case 2 or lower case 3, and to the outside when the lid 6 is opened.

Also, there are second position determining holes 18a and 18b arranged in the lower case 3.

Figure 8:
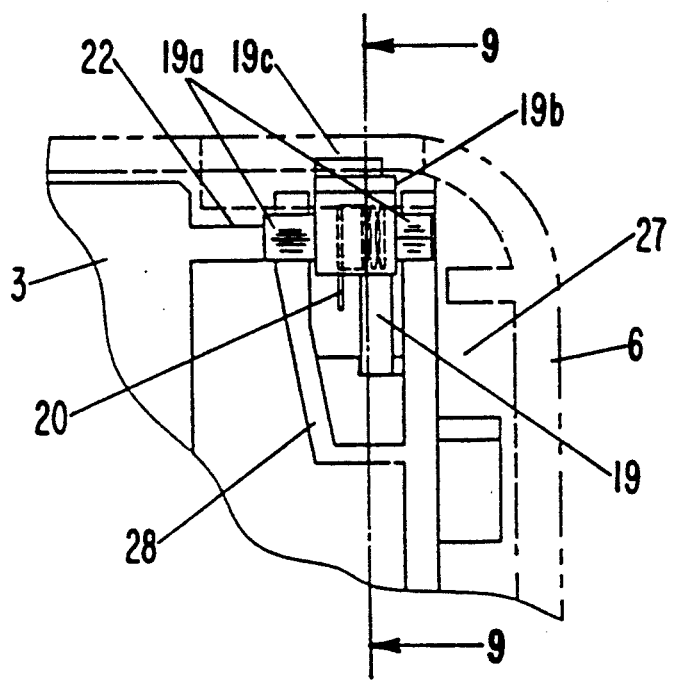
FIG. 8 is an enlarged plan view of a lid locking section of the tape cassette shown in FIG. 1.
Figure 9:
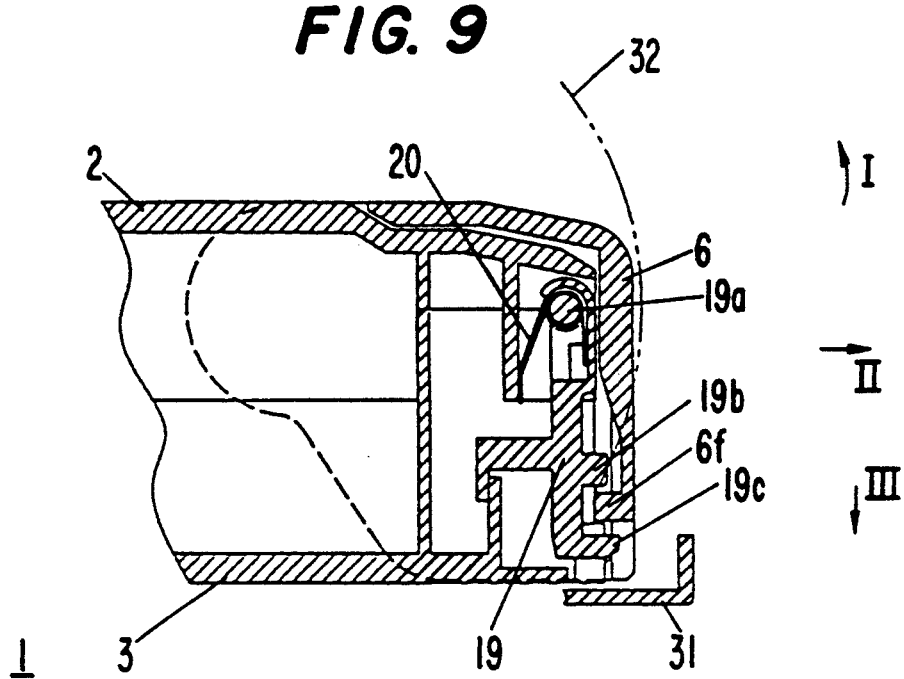
FIGS. 9 and 10 are cross-sectional views taken along the line 9—9 of FIG. 8 showing unlocked and locked states, respectively.
Figure 10:
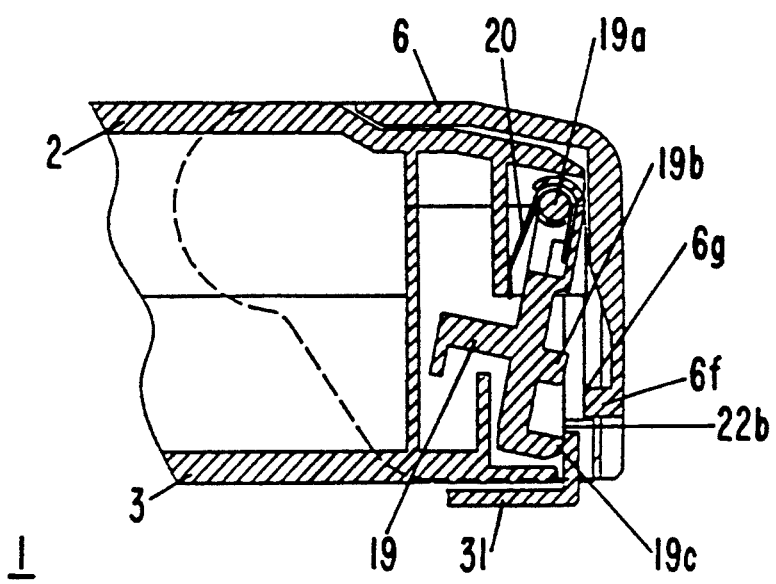

As shown in FIGS. 8 to 10, a locking member 19 is provided which can engage with a lid locking portion 6f arranged in the forward inner surface of the front lid 6 for locking the front lid 6, when the cassette 1 remains not loaded in a VTR (not shown), thus preventing inadvertent opening of the lid 6 which may cause damage to the magnetic tape 5.

The locking member 19 is yieldingly urged by a front lid locking spring 20 in such a direction (frontward of the cassette) that it remains engaged with the lid locking portion 6f of the front lid 6.

Also, the locking member 19 is supported by the upper and lower cases 2 and 3 for pivotal movement on a pair of pivot shafts 19a. A protrusion 19b arranged on one end of the locking member 19 extends outward from a cutout 23 provided in the front of the upper and lower cases 2 and 3 (see FIG. 7).

When the front lid 6 is closed, the protrusion 19b remains in contact with a contacting side 6g of the lid locking portion (or locking member) 6f preventing the lid 6 from moving in the opening direction denoted by the arrow I.

Left and right pre-positioning portions 22a and 22b are arranged on the front side of the lower case 3 for positioning the tape cassette 1 in a cassette 1 into an unshown VTR.

Also, the locking member 19 has a contacting portion 19c arranged beneath the protrusion 19b and extending from a cutout 21 which formed in the pre-positioning portion 22b and communicates with the cutout 23.

There are provided two reel brakes 24a and 24b for preventing inadvertent rotation of the reels 4a and 4b when the cassette is not loaded in the VTR, to thereby prevent loose tape rewinding. The reel brakes 24a and 24b are arranged for turning about shafts 25a and 25b mounted between the upper and lower cases 2 and 3 and remain urged by a reel braking spring 26 so that their distal ends can engage with the reels 4a and 4b, respectively.

Denoted by 27 is a lid opening cutout portion arranged between the upper and lower cases 2 and 3 for accepting a lid opening member (not shown) which is provided in the VTR for opening the front lid 6 during loading.

28 is a partition wall which is provided for separating the locking member 19 and the front lid locking spring 20 from the two tape rolls 13a and 13b disposed between the upper and lower cases 2 and 3.

29 is a reel brake releasing hole into which a brake releasing pin (not shown) of the VTR is inserted to trigger the disengagement of the reel brakes 24a and 24b from their respective reels 4a and 4b.

30 is a reel brake releasing lever for actuating the reel brakes 24a and 24b to release their respective reels 4a and 4b.

31 is a pre-positioning plate provided in the unshown cassette holder for positioning the tape cassette 1 when coming into direct contact with the pre-positioning portions 22a and 22b of the lower case 3.

The one-dot chain line 32 shown in FIG. 9 represents a moving path o the contacting portion 6g of the front lid 6.

The arrangement in a relevant VTR will now be described referring to FIGS. 11 and 12.

Figure 11:
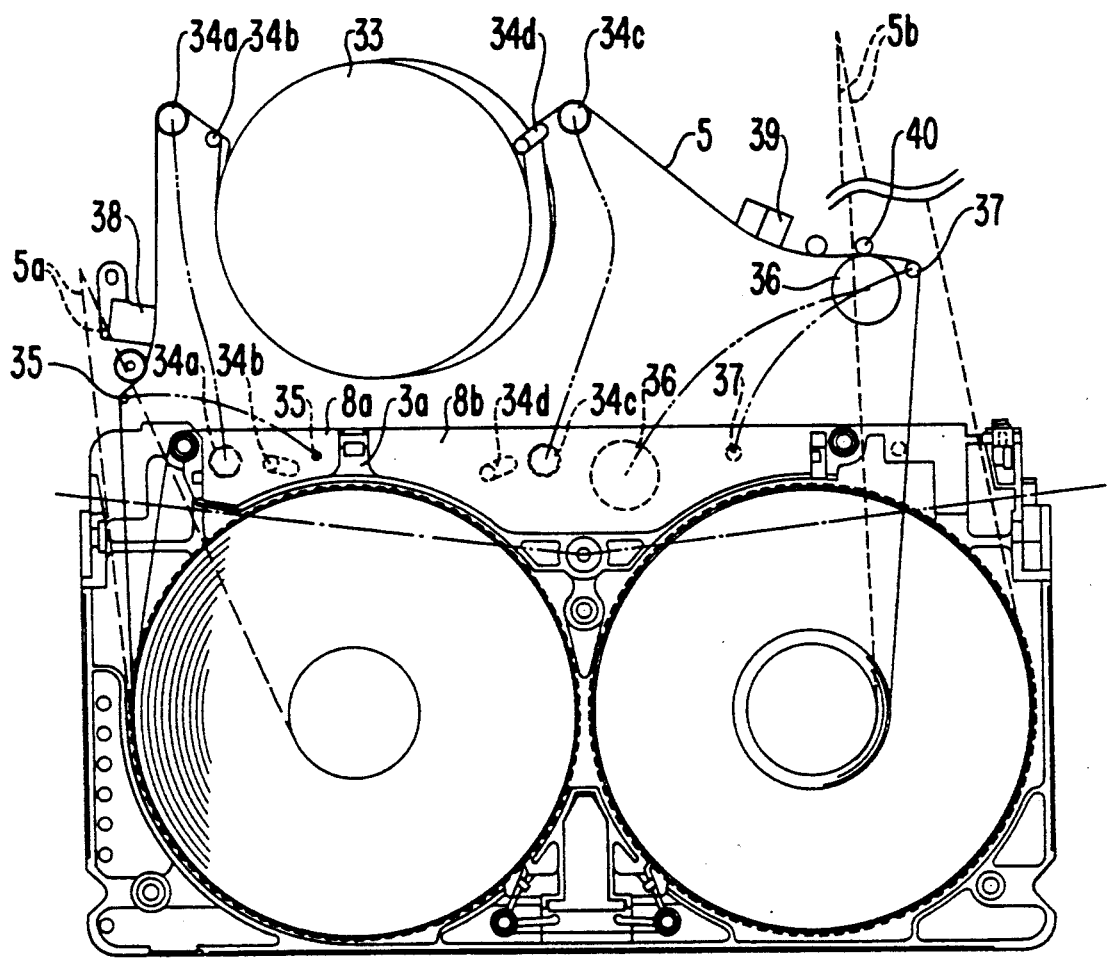
FIG. 11 is a plan view showing the loading of the tape cassette onto an M loading arrangement.

In an M loading arrangement illustrated in FIG. 11, there is provided a cylinder 33 for recording and reproducing of signals.

Upright and slanted loading posts 34a and 34b are arranged at the feed-in side for passing the magnetic tape 5 about the left half of the cylinder 33, both being mounted on one moving plate (not shown).

Also, two loading posts 34c and 34d are arranged at the take-up side for passing the magnetic tape 5 about the right half of the cylinder 33, both being mounted on one moving plate (not shown).

A tension regulating post 35 is provided for controlling a tension on the running magnetic tape 5.

Also, there are provided a pinch roller 36, a take-up side post 37, a full-erase head 38 for erasing data from the entire width of the magnetic tape 5, and an A/C head 39 for controlling rotation of the cylinder 33 relative to the running speed of the magnetic tape 5. A capstan 40 is arranged for driving the tape which is pinched between the capstan 40 and the pinch roller 36.

Figure 12:
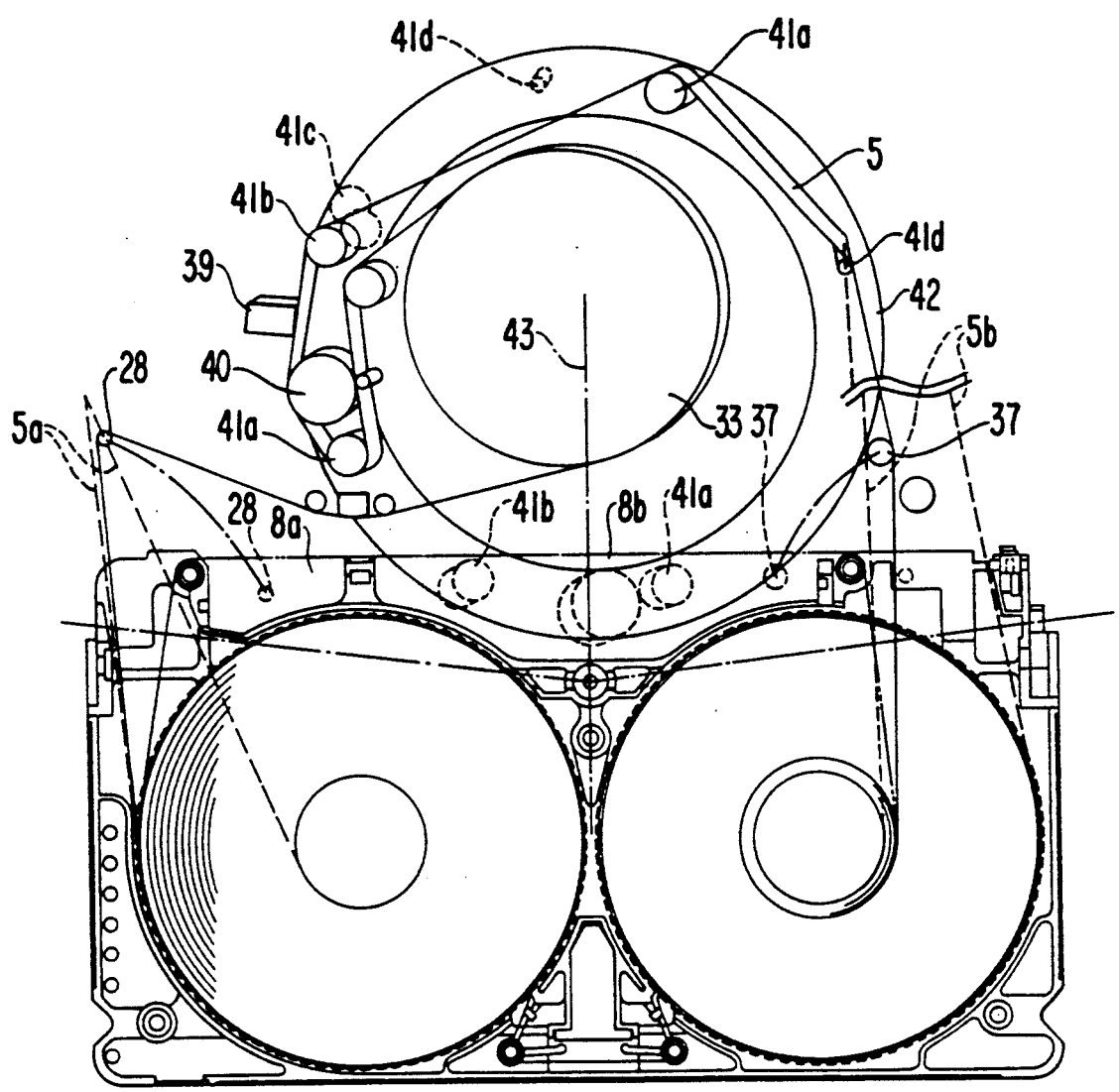
FIG. 12 is a plan view showing the loading of the tape cassette onto a U loading arrangement.

In a U loading arrangement shown in FIG. 12, there are loading posts 41a, 41b, 41c, and 41d mounted upwardly on single loading ring 42.

Denoted by 43 is the center line of the tape cassette 1 which extends near the center of the cylinder 33.

There is provided an accidental erase protection hole 44 for allowing the VTR to judge whether the writing of data onto the magnetic tape 5 is feasible or not. Also, a row of recognition holes 45a to 45f (see FIG. 2) are provided for allowing the VTR to detect various characteristics, e.g. thickness, length, and material, of the magnetic tape 5 carried in the tape cassette 1.

The operation of the tape cassette 1 having the foregoing arrangement will now be described.

Figure 4A:
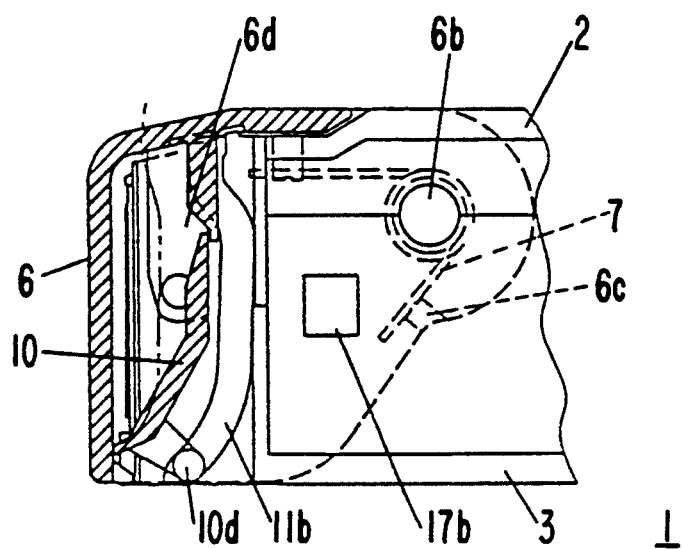
FIGS. 4(a) and 4(b) are cross-sectional views of the tape cassette taken along the line 4—4 of FIG. 1 showing the closing and opening states of the front lid, respectively.
Figure 5A:
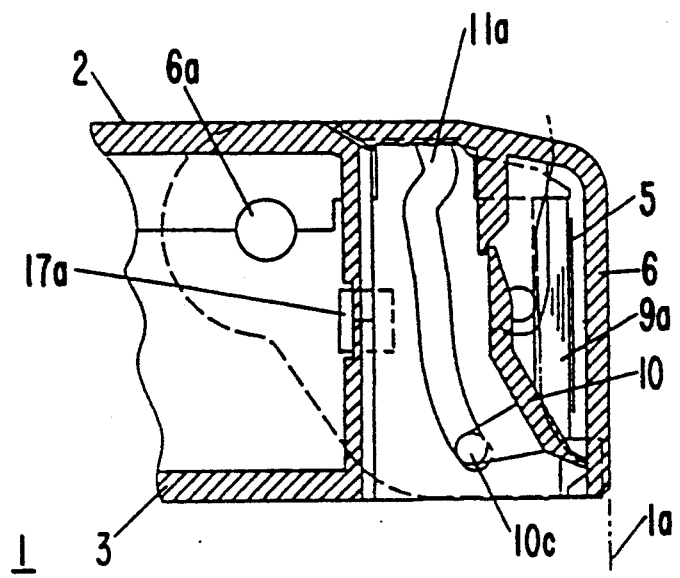
FIGS. 5(a) and 5(b) are cross-sectional views of the tape cassette taken along the line 5—5 of FIG. 1 showing the closing and opening states of the front lid, respectively.

FIGS. 4a, 5a, and 6a are cross section views showing the lid closing state in which the tensioned portion of the magnetic tape 5 extending across the two openings 8a and 8b is protected between the front lid 6 and the inner lid 10.

As best shown in FIGS. 8 to 10, the front lid 6 remains locked with the contacting side 6g of its lid locking portion 6f, which can move along an arcuate line 32, held in contact with the protrusion 19b of the locking member 19. Thus, inadvertent movement of the front lid 6 in the direction of the arrow I is prevented.

Accordingly, damage to the magnetic tape 5 which could otherwise be caused by inadvertent opening of the front lid 6 is avoided.

When the tape cassette 1 is loaded into the unshown VTR (in the direction denoted by the arrow II of FIG. 9), the pre-positioning plate 31 of the unshown cassette holder comes into contact with the pre-positioning portions 22a and 22b. Simultaneously, the contacting portion 19c of the locking member 19 projecting through the cutout 21 of the pre-positioning portion 22b is actuated by the positioning plate 31 to turn clockwise about the pivot shafts 19a. Thus, the protrusion 19b disengages from the lid locking portion 6f allowing the front lid 6 to move upward for opening.

As also shown in FIGS. 1 to 7, the downward movement of the tape cassette 1 in the direction denoted by the arrow III (FIG. 9) allows the unshown lid opening member of the VTR to move into the lid opening cutout 27 formed by the upper and lower cases 2 and 3. As the tape cassette 1 advances in the direction of arrow III, a force is applied for turning the front lid 6 about the front lid pivot shafts 6a and 6b (clockwise in FIGS. 4a and 4b). As the result of the movement in the direction of arrow III, the front lid 6 is opened upward against the urging force of the front lid spring 7.

Figure 4B:
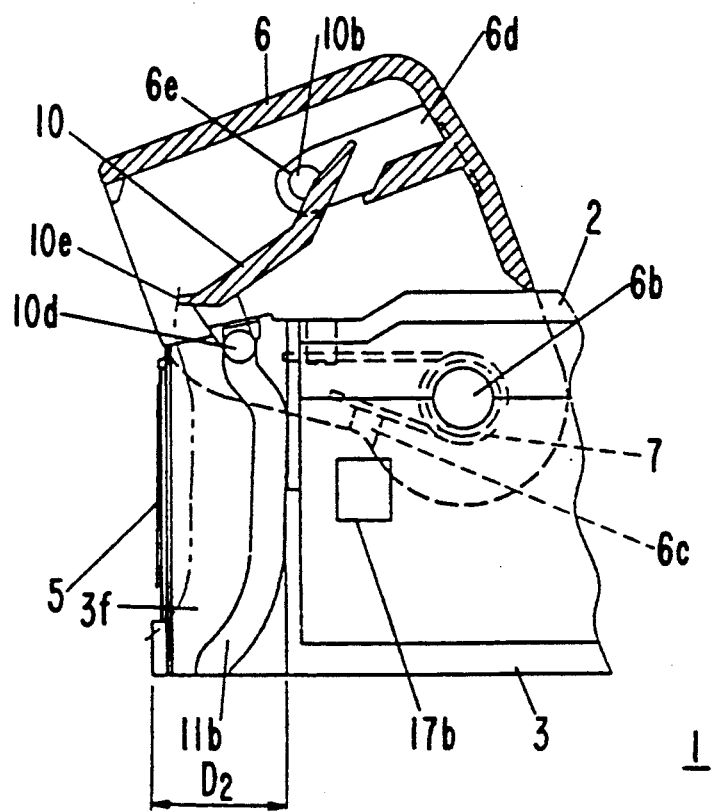
Figure 5B:
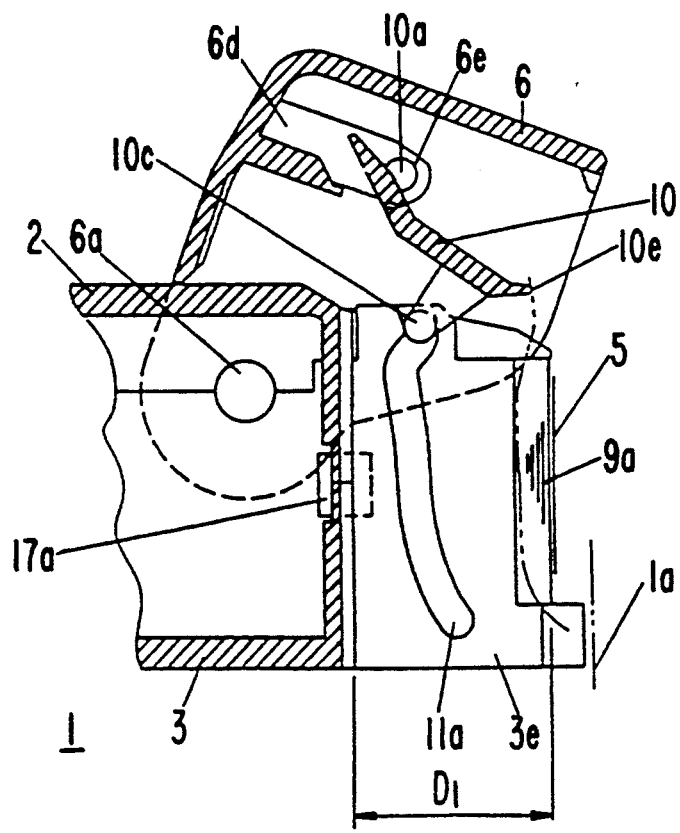

Meanwhile, the inner lid 10 is moved about the left and right inner lid pivot shafts 10a and 10b, together with the front lid 6, while travelling along the left and right guiding grooves 11a and 11b provided in the lower case 3. Then, the resultant opening state is as illustrated in FIGS. 4b, 5b, and 6b.

The shape of the left and right guiding grooves 11a and 11b is so arranged that as the inner lid 10 travels to a given distance about the coaxially aligned pivot shafts 10a and 10b, its left and right guide pins 10c and 10d spaced unequally from their respective pivot shafts 10a and 10b are moved along the guiding grooves 11a and 11b. Accordingly, while the inner lid 10 is guided by either the left guiding groove 11a or the right guiding groove 11b, its distal end 10e travels along a definite path denoted by the two-dot chain line of FIGS. 4 to 6.

More particularly, the inner lid 10 always travels behind the magnetic tape 5 as the front lid 6 is pivoted upward for opening.

Also, upon the opening of the front and inner lids 6 and 10, the unshown reel brake releasing pin of the VTR moves into the reel brake releasing hole 29 and presses the releasing lever 30 downward. The releasing lever 30 then actuates the reel brakes 24a and 24b to turn backward and release the locking of the two reels 4a and 4b. In the end, the reels 4a and 4b are supported by two reel holders (not shown) respectively arranged in the VTR and will be ready for rotation.

At the same time, the lighthouse 14 of the VTR for detection of the leading and trailing ends of the magnetic tape 5 is advanced into the insertion hole 15 of the tape cassette 1.

During running at a high speed or being drawn out from the tape cassette 1, the magnetic tape 5 comes into contact with the guide posts 9a and 9b. For preventing damage to the tape 5 during high speed and high precision running of the magnetic tape 5, the guide posts 9a and 9b are preferably much improved in surface roughness and in their resistance to environmental change, deterioration with time, and wear.

The operation of the M loading arrangement shown in FIG. 11 will now be described.

For loading of the magnetic tape 5 around the cylinder 33, the supply-side loading posts 34a and 34b and the tension post 35 are moved into the opening 8a of the tape cassette 1 and the takeup-side loading posts 34c and 34d and the pinch roller 36 are moved into the opening 8b of symmetrical shape.

When a loading command is given, the magnetic tape 5 is drawn out from the position denoted by the dotted line in FIG. 11 to the position denoted by the solid line in FIG. 11 for running across the tape path areas 5a and 5b in common operation. Then, the tape can run along the cylinder 33, the full erase head 38, and the A/C head 39, with a prescribed length of the tape being wrapped around the cylinder.

As shown, the loading format having a long path between the cylinder 33 and the A/C head 39 allows the cylinder 33 to be located at the left of the tape cassette 1 for compact arrangement of the tape running assembly. More particularly, the posts constituting the tape running assembly are arranged so that they do not extend outwardly beyond the side ends of the tape cassette 1. In such an M loading arrangement, the left opening 8a of the tape cassette 1 can advantageously accept the insertion of the loading posts 34a and 34b and the tension post 35.

The operation of the U loading arrangement will now be described with reference to FIG. 12.

For loading of the magnetic tape 5 around the cylinder 33, the takeup-side loading posts 41a and 41b, the pinch roller 36, and the takeup-side post 37 are moved into the symmetrical opening 8b of the tape cassette 1 and the tension post 35 is moved into the opening 8a, as denoted by the dotted lines.

When a loading command is given, the counterclockwise rotation of the loading ring 42 carrying the posts 41a, 41b, 41c, and 41d causes the magnetic tape 5 to be wrapped around the cylinder 33 as shown by the solid line. Simultaneously, the tension post 35 and the takeup-side post 37 are shifted from the position denoted by the dotted line to the position denoted by the solid line.

The U loading arrangement features the plurality of loading posts 41a, 41b, 41c, and 41d disposed in a circle more or less coaxially of the cylinder 33. More particularly, all the loading posts 41a, 41b, 41c, and 41d are mounted on the single loading ring 42 for the purpose of reducing the number of relevant components and the cost of fabrication.

Outward feeding of the magnetic tape 5 can be carried out smoothly through the laterally symmetrical opening 8b with use of the loading ring 42 on which the posts are carried.

Although the foregoing description refers to the loading of the tape cassette 1 into the cassette loading position of a VTR, unloading will be executed with equal success by carrying out the loading operation in reverse.

According to the embodiment of the present invention, the movement of the inner lid 10 is restricted by the left and right guiding grooves 11a and 11b while the distal end 10e of the inner lid 10 travels along a given path. However, the present invention is not limited to that arrangement. For example, the left guiding groove 11a may have such a shape that it can control only the opening of the inner lid 10, and the right groove 11b may have such a shape that it can control only the closing of the same, or vice versa.

Also, the thin wall portion 12 may be cut out for allowing the guide post 9a to be displaced closer to the opening 8a.

In the M loading arrangement shown in FIG. 11, the opening 8a is arranged on the left of the laterally symmetrical opening 8b to correspond to the position of the cylinder 33 disposed at the left of the tape cassette 1 while the magnetic tape 5 runs from the reel 4a to the reel 4b. If the magnetic tape 5 runs in a reverse direction, the opening 8a may be arranged on the right of the symmetrical opening 8b.

What is claimed is:

1. A tape cassette comprising:
    a pair of tape reels for winding a tape thereon and for respectively fixedly holding leading and trailing ends of said tape, each of said tape reels having a rotational axis;
    a cassette case having a front, a back, and opposing side surfaces, and containing said pair of tape reels therein with a forwardly exposed portion of the tape being extended across said front of said cassette case, an opening being provided in said cassette case behind said forwardly exposed portion of the tape;
    first and second side walls arranged in the cassette case and having first and second surfaces, respectively, defining therebetween said opening;
    first and second guide posts mounted on said cassette case at positions close to said first and second side walls, respectively, for guiding the forwardly exposed portion of the tape along a line;
    a front lid pivotably supported on said side surfaces of said cassette case for pivotal movement between a closed position in which said front lid covers a front surface of said forwardly exposed portion of the tape and an open position in which said front lid does not cover said forwardly exposed portion of the tape;
    an inner lid pivotably supported on said front lid for pivotal movement between a closed position in which said inner lid covers a back surface of said forwardly exposed portion of the tape when said front lid is in its closed position, and an open position in which said inner lid does not cover the back front surface of said forwardly exposed portion of the tape when said front lid is in its open position; and
    wherein a forwardly and rearwardly extending partition is mounted in said casing between said first and second side walls and is located on a forwarding and rearwardly extending center line extending through said rotational axis of one of said tape reels, said partition dividing said opening into a first opening and a second opening, said first opening being located substantially centrally between said opposing side surfaces of said cassette case and having a symmetrical shape.

2. The tape cassette according to claim 1, further comprising a stopper plate mounted on said partition for restricting a rearward movement of said forwardly exposed portion of the tape, at least a part of said stopper plate being covered by said front lid positioned forwardly of said stopper plate, and by said inner lid positioned rearwardly of said stopper plate, when said front and inner lids are in their respective closed positions.

3. The tape cassette according to claim 1, wherein said partition has provided therein a positioning hole for allowing a positioning pin of a recording/reproducing apparatus to be inserted thereinto to thereby determine a position of said tape cassette in the recording/reproducing apparatus.

* * * * *